United States Patent
Srinivasan

(12) 
(10) Patent No.: US 6,837,417 B2
(45) Date of Patent: Jan. 4, 2005

(54) METHOD OF SEALING A HOLLOW CAST MEMBER

(75) Inventor: Vasudevan Srinivasan, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/247,112

(22) Filed: Sep. 19, 2002

(65) Prior Publication Data

US 2004/0056079 A1 Mar. 25, 2004

(51) Int. Cl.$^7$ .......................... B23K 31/02; B23K 31/00
(52) U.S. Cl. ................. 228/119; 228/234.1; 228/235.1; 228/248.1
(58) Field of Search ............................. 228/119, 248.1, 228/234.1, 235.1; 29/402.02, 402.09, 889.1, 889.7, 889.72

(56) References Cited

U.S. PATENT DOCUMENTS

| | | | |
|---|---|---|---|
| 3,574,482 A | | 4/1971 | Savage et al. |
| 3,773,506 A | | 11/1973 | Larker et al. |
| 3,940,268 A | | 2/1976 | Catlin |
| 3,982,854 A | * | 9/1976 | Berry et al. ............ 416/213 R |
| 4,010,531 A | | 3/1977 | Andersen et al. |
| 4,020,538 A | | 5/1977 | Dennis et al. |
| 4,073,599 A | | 2/1978 | Allen et al. |
| 4,589,824 A | | 5/1986 | Kozlin |
| 4,610,698 A | | 9/1986 | Eaton et al. |
| 4,614,296 A | | 9/1986 | Lesgourgues |
| 5,040,718 A | * | 8/1991 | Lee et al. .................... 228/119 |
| 5,071,054 A | * | 12/1991 | Dzugan et al. ............. 228/119 |
| 5,145,105 A | | 9/1992 | Floroski et al. |
| 5,156,321 A | * | 10/1992 | Liburdi et al. ............... 228/119 |
| 5,363,554 A | | 11/1994 | Partridge et al. |
| 5,655,701 A | * | 8/1997 | Quattrocchi et al. ......... 228/119 |
| 6,107,740 A | * | 8/2000 | Morimoto et al. .......... 313/625 |
| 6,109,505 A | | 8/2000 | Malie et al. |
| 6,195,864 B1 | * | 3/2001 | Chesnes .................. 29/402.01 |
| 6,332,272 B1 | | 12/2001 | Sinnott et al. |
| 6,454,156 B1 | * | 9/2002 | Taras et al. .................. 228/165 |
| 6,454,885 B1 | * | 9/2002 | Chesnes et al. ............. 148/528 |
| 6,624,225 B1 | * | 9/2003 | Ellison et al. ............... 524/434 |
| 2004/0050913 A1 | * | 3/2004 | Philip ......................... 228/194 |

* cited by examiner

Primary Examiner—L. Edmondson

(57) ABSTRACT

A method of sealing an opening in a cast member that employs a green seal cap formed from the consolidation of a mixture of powdered metal and a binder under sufficient pressure to impart enough strength to the cap to maintain its shape during the blade manufacturing process. The green seal plate cap is inserted into the opening in the cast member and the cast member is subjected to iso-static pressing, which bonds the seal plate cap to the cast member and sinters the cap to form a solid seal.

11 Claims, 1 Drawing Sheet

METHOD OF SEALING A HOLLOW CAST MEMBER

BACKGROUND OF THE INVENTION

1. Field of the Invention

This invention relates generally to metal components and, more particularly, to a method of sealing an opening in a hollow metal component.

2. Related Art

A turbomachinery blade is typically comprised of a retaining or root section, a platform section and an airfoil section. Since it is desirable that a turbomachine be operated at high speeds and temperatures, the airfoil section of the blade is preferably formed of relatively thin convex and concave sidewalls defining an internal cavity, which has provided therein means for cooling the blade sidewalls. In an air cooled blade, the cooling air is commonly brought in through passageways in the root portion of the blade to the airfoil cavity which is divided by a plurality of ribs into heat transfer chambers and serpentine passageways. In an open cooling path arrangement, the cooling air within the cavity acts to cool the blade sidewalls by a combination of impingement, convection and film cooling, and then is normally discharged out through film holes and trailing edge holes.

Because of the critical aerodynamic shape of the blade, and the required intricate structure in the cavity portion thereof, one practical method of fabrication has been by way of the casting process, wherein precision casting techniques are used to fabricate the turbine blade airfoil and root section. When such an investment casting is used for the turbine blade, it is desirable to use a ceramic or glass core to form the internal chambers and passageways within the airfoil cavity. This is normally facilitated by leaving open the tip end of the airfoil and allowing the ceramic core to extend outwardly therefrom for purposes of handling and positioning the core for location during the fabrication process. It then subsequently becomes necessary to seal the tip end of the blade in order to prevent cooling fluid from being wastefully discharged into the working gas stream. This open tip end of the blade is generally sealed by means of a tip cap, which is joined to the blade with either a metallurgical or mechanical bond.

The opening in the blade tip is commonly referred to as the core print. One method of closing the core print is to braze a relatively thin metal plate of IN625 to the top surface of the blade over the core print opening to seal the opening, subsequent to taking the blade through the hot iso-static pressing step which is employed to eliminate cast defects. The thin metal seal plate is tack-welded around the blade tip core print opening, typically with brazing tape or brazing powder applied in the contact area between the blade tip and the seal plate.

A second method for sealing the tip that is currently employed uses the Liburdi Powder Metallurgy Process described in U.S. Pat. No. 5,156,321. In the application of this process, a land is typically machined in the core print opening, forming a step in the lower surface of the opening just above the cooling chamber. The seal plate is inserted into the opening resting on and supported by the land while bridging the opening. The volume above the IN625 seal plate is filled with a powder of the blade alloy and topped with a melting point depressant. The blade is then thermally cycled to sinter the alloy powder.

Both processes have not been able to produce parts with zero or minimum rejects or parts with tip closure plates that remain in position in service, due to inadequate long term bond strength as a result of the tremendous centrifugal forces and high temperatures experienced at the blade tips during turbine operation.

Accordingly, it is an object of this invention to provide an improved method of sealing the blade tips that will result in fewer defects.

It is an additional object of this invention to provide a new manufacturing method for sealing the blade tips that provide for a stronger metallurgical bond between the seal plate and the blade tip.

It is a further object of this invention to provide such an improved manufacturing method that will reduce the number of manufacturing steps and insure the cooling passages are not blocked as the result of the bonding operation sealing the seal plate to the blade tip.

It is another object of this invention to avoid undesirable effects of melting point depressant, such as boron, on component properties.

SUMMARY OF THE INVENTION

These and other objects are achieved by a manufacturing process that consolidates a metal alloy powder, preferably having a chemical composition substantially the same as the blade alloy, into the shape of a cap that will snugly fit into the core print opening. Preferably, the powdered alloy is mixed with a fugitive organic binder, which can be burned at low temperatures if necessary prior to hot iso-static pressing or at the temperatures experienced during the hot iso-static blade manufacturing step. The compaction can be carried out under cold iso-static pressure or uniaxial pressure to impart sufficient green strength to the cap to maintain its shape. Desirably, the circumferential shape of a portion of the cap mirrors the contour of the opening of the core print. For easy insertion of the cap within the core print, the cap can be cooled to a lower temperature so that it forms a shrink fit. The foregoing step in the blade manufacturing process occurs after investment casting and before the hot iso-static pressing step, which is a part of the current manufacturing process.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

In accordance with this invention, tip seal plates are prepared by cold compaction of a mixture of metal alloy powder and an organic binder so that the seal plate that is formed has adequate green strength to maintain its shape during the manufacturing process. Preferably, the metal alloy powder has the same chemical composition as the blade alloy, which is typically a γ' strengthened material. Alternately, another powdered metal or graded composition can be used in place of the blade alloy. The compaction process shapes the seal plate cap portion to be inserted in the tip opening to mirror the shape of the opening and size the mirrored shape to snugly fit into the core print. Preferably, the binder is a fugitive organic binder, which can be burned at low temperatures (e.g., between 300° F. and 485° F. (150° C. and 250° C.)) if necessary prior to hot iso-static pressing or at temperatures experienced during the hot iso-static blade manufacturing step, which range from 2012° F. to 2375° F. (1100° C. to 1300° C.). Examples of organic binders that can be used for this purpose include starches, cellulose, polymers and cellulose acetate. The preferred organic binders are polyvinylalcohol (PVA) and polyethyleglycol (PEG). Preferably, the mirrored shape of the seal plate is sized to be slightly larger than the core print opening so that it can be snapped in place and held snugly. In the preferred embodiment, the mirrored shape portion of the seal plate is cooled prior to its insertion in the opening so it can form a shrunk fit. Alternately, the core print can be heated, the seal plate inserted and the blade let to cool to establish the shrunk fit. Insertion of the seal plate cap into the core print opening occurs after the investment casting step and prior to the hot iso-static pressing step, which are part of the current blade manufacturing process. This method does not require any melting point depressant such as boron used in brazing or the Liburdi process. No additional heat treatment cycling is required with this process. The hot iso-static pressing step not only eliminates cast defects, but also creates a metallurgical bond between the seal plate insert and the blade. In addition, during the hot iso-static pressing step, the cold compacted seal plate powder is sintered to form a solid seal. Dimensional allowances should be given to the cold compacted seal plates to accommodate any systematic shrinkage associated with the sintering that occurs during the hot iso-static pressing step. In an additional embodiment, the cold compacted seal plates may be prepared with through-thickness fine holes for cooling the tip.

Figure 1:
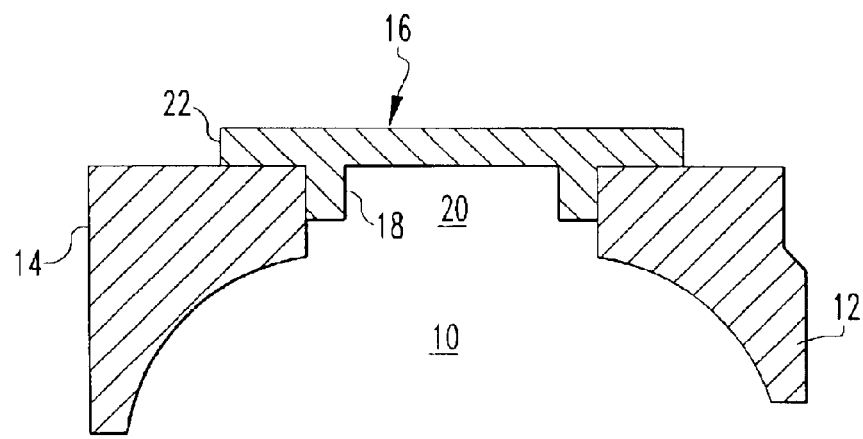
FIG. 1 is a cross-sectional view of a blade tip illustrating the core print with one embodiment of the seal plate or cap of this invention sealing the opening.

FIG. 1 illustrates a core print opening 10 formed by turbine blade walls 12 and 14 and capped in accordance with this invention by the seal plate 16 formed in accordance with this invention. The seal plate 16 has a downwardly-extending land 18 that is snapped into the opening as mentioned above. The lip 22 of the seal plate cap 16 overlaps the top surface of the blade tip and the entire surface of the lip 22 and land 18, that interface with the blade, are metallurgically bonded during the hot iso-static pressing step. The annular opening 20 in the land 18 adds some flexibility to the land 18, making it slightly easier to snap the seal plate cap 16 into place within the core print opening 10.

Figure 2:
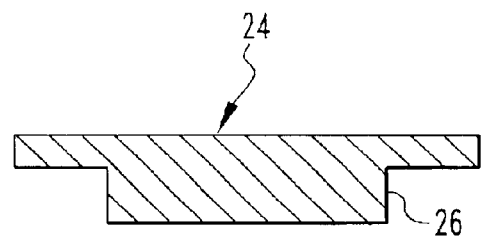
FIG. 2 is a cross-sectional view of another embodiment of the seal plate of this invention.

FIG. 2 illustrates a second slightly more rugged design for the seal plate cap herein represented by reference character 24. The cap 24 in this instance has a solid land 26, which can be shrunk-fit into the core print opening 10.

Though this invention has been described for sealing openings in cast turbine blades, it should be appreciated that it can be applied to sealing any hole in a surface of a hollow cast member. In addition to being applied to the manufacture of new blades, this invention can also be applied to blades that had been placed in service and need to have their core print opening seals repaired.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of sealing a hole in a surface of a hollow cast member comprising the steps of:

forming a sealing plate having a circumferential shape that substantially conforms to the hole, from a mixture of metal powder and an organic binder, compacted to impart sufficient green strength to maintain the shape of the plate, said mixture being substantially-free of melting point depressant;

placing the circumferential shape of the sealing plate within the hole to close the hole; and creating a metallurgical bond between the plate and the member by heating the member and subjecting said plate and said member to an iso-static pressing step, said bond being formed without the use of melting point depressant.

2. The method of claim 1 wherein the metal powder has substantially the same composition as the member.

3. The method of claim 1 wherein the binder is a fugitive organic binder that can be burnt at temperatures achieved during hot iso-static pressing.

4. The method of claim 1 wherein the circumferential shape is slightly larger than the hole and wherein the placing step snaps the circumferential shape within the hole to seal the hole.

5. A method of sealing a hole in a surface of a hollow cast member comprising the steps of:

forming a sealing plate having a circumferential shape that substantially conforms to the hole, from a mixture of metal powder and an organic binder, compacted to impart sufficient green strength to maintain the shape of the plate, said mixture being substantially-free of melting point depressant;

placing the circumferential shape of the sealing plate within the hole to close the hole; and creating a metallurgical bond between the plate and the member by heating the member said bond being formed without the use of melting point depressant, wherein the plate has an outwardly extending land that forms the circumferential shape and defines a lip on the plate that overlaps the surface of the member when the circumferential shape is placed within the hole.

6. The method of claim 5 wherein the outwardly extending land is hollow.

7. A method of sealing a hole in a surface of a hollow cast member comprising the steps of:

forming a sealing plate having a circumferential shape that substantially conforms to the hole, from a mixture of metal powder and an organic binder, compacted to impart sufficient green strength to maintain the shape of the plate, said mixture being substantially-free of melting point depressant;

placing the circumferential shape of the sealing plate within the hole to close the hole; and creating a metallurgical bond between the plate and the member by heating the member said bond being formed without the use of melting point depressant, wherein the plate is cooled prior to placing the circumferential shape within the hole, so that that circumferential shape is shrunk-fit within the hole prior to hot iso-static pressing.

8. The method of claim 1 wherein the cast member is a turbine blade and the powdered metal is a gamma prime strengthened superalloy.

9. The method of claim 1 wherein the mixture of metal powder and organic binder is cold compacted.

10. The method of claim 1 wherein the creating step heats an interface between the cast member and the sealing plate to a temperature within the range of 300° F.–485° F. (150° C.–250° C.) to burn the binder.

11. A method of sealing a hole in a surface of a hollow cast member comprising the steps of:

forming a sealing plate having a circumferential shape that substantially conforms to the hole, from a mixture of metal powder and an organic binder, compacted to impart sufficient green strength to maintain the shape of the plate, said mixture being substantially-free of melting point depressant;

placing the circumferential shape of the sealing plate within the hole to close the hole; and creating a metallurgical bond between the plate and the member by heating the member said bond being formed without the use of melting point depressant, wherein the cast member is heated prior to placing the circumferential shape within the hole, so that the circumferential shape is shrunk-fit within the hole when the member cools.

* * * * *